(12) United States Patent
So

(10) Patent No.: US 9,727,048 B2
(45) Date of Patent: Aug. 8, 2017

(54) APPARATUS, SYSTEM AND METHOD FOR MONITORING PLANTS

(71) Applicant: Sang Eco System Limited, Shatin (HK)

(72) Inventor: Kwai Sang So, Shatin (HK)

(73) Assignee: SANG ECO SYSTEM LIMITED, Hong Kong (HK)

( * ) Notice: Subject to any disclaimer, the term of this patent is extended or adjusted under 35 U.S.C. 154(b) by 373 days.

(21) Appl. No.: 14/402,027

(22) PCT Filed: Jul. 3, 2014

(86) PCT No.: PCT/IB2014/062819
§ 371 (c)(1),
(2) Date: Nov. 18, 2014

(87) PCT Pub. No.: WO2015/004578
PCT Pub. Date: Jan. 15, 2015

(65) Prior Publication Data
US 2016/0266570 A1 Sep. 15, 2016

(30) Foreign Application Priority Data
Jul. 11, 2013 (HK) .................................. 13108124.7

(51) Int. Cl.
*A01G 1/00* (2006.01)
*A01G 7/00* (2006.01)
(Continued)

(52) U.S. Cl.
CPC ........... *G05B 19/406* (2013.01); *A01G 1/001* (2013.01); *A01G 7/00* (2013.01); *A01G 9/00* (2013.01);
(Continued)

(58) Field of Classification Search
CPC . A01G 1/001; A01G 7/00; A01G 9/00; A01G 9/24; A01G 9/26; G05B 19/406; G05B 2219/37591
(Continued)

(56) References Cited

U.S. PATENT DOCUMENTS 5,774,055 A * 6/1998 Pomerantz ........... A61B 5/0002
340/517
8,477,027 B2 * 7/2013 Givens .................... B66C 13/44
340/538

(Continued)

*Primary Examiner* — Mark Connolly
(74) *Attorney, Agent, or Firm* — Miskin & Tsui-Yip LLP; Gloria Tsui-Yip, Esq.

(57) ABSTRACT

The present invention relates to an apparatus, system and method for monitoring plant. A sensor means can be adapted for receiving plant growth information of the plant being received inside a container. An indicating means can be adapted for indicating information of the plant growth information. A wireless communication means can be adapted for transmitting the plant growth information to an external device. A control means can select a working mode of the indicating means and the wireless communication means. Through the cooperative effect of the sensor means, the storage means, the indicating means and the wireless communication means, operators do not have to take along with instruments to perform measurement reading of the on-site plant growth information at a regular time, thereby saving labor cost and time cost of monitoring the plant growth information and improving efficiency of plant monitoring.

14 Claims, 2 Drawing Sheets

(51) Int. Cl.
*G05B 19/406* (2006.01)
*A01G 9/00* (2006.01)
*A01G 9/26* (2006.01)

(52) U.S. Cl.
CPC ...... *A01G 9/26* (2013.01); *G05B 2219/37591* (2013.01)

(58) Field of Classification Search
USPC .................................. 713/320, 300; 700/275
See application file for complete search history.

(56) References Cited

U.S. PATENT DOCUMENTS

| | | | | |
|---|---|---|---|---|
| 2002/0186137 | A1* | 12/2002 | Skardon | G06F 19/3418 340/573.1 |
| 2003/0202558 | A1* | 10/2003 | Chung | G01K 1/024 374/155 |
| 2013/0226357 | A1* | 8/2013 | Ersavas | A01G 1/00 700/284 |

* cited by examiner

APPARATUS, SYSTEM AND METHOD FOR MONITORING PLANTS

TECHNICAL FIELD

The present invention refers to an apparatus, system and method for monitoring plant.

BACKGROUND OF THE INVENTION

In the course of cultivating potted plants, certain plant growth information is required to be monitored at a regular time to have plant growth information of a plant, such as collecting illumination information and humidity information, etc. Then, the user analyzes the collected plant growth information and thus timely adjusts the environmental parameters of the plant, such as increasing humidity and lower temperature, etc. in order to provide a better means for plant growth.

The existing method, apparatus and system for monitoring plant growth is to use humidometers, thermometers and other instruments to measure of the environmental information of the plant by users and then record the related plant growth information. However, it wastes a large labor hours and man power to perform such work. In addition, the existing method can only measure the environment information or plant growth information away from the plant. Further, the reading is viewed by eye-sight which is not so accurate and affects the effectiveness of the reading result.

SUMMARY OF THE INVENTION

The problem to be solved in the present invention is to provide an apparatus, system and method for monitoring a plant in order to save labor cost and time cost of monitoring plant growth information of the plant and improve the effectiveness of plant monitoring.

The present invention provides an apparatus for monitoring plant comprising a sensor means adapted for receiving plant growth information of a plant being received inside a container; a storage means being mounted to the said sensor means adapted for collecting and storing the said plant growth information received by the said sensor means; an indicating means being mounted to the said storage means adapted for indicating information of the said plant growth information stored in the said storage means; a wireless communication means being mounted to the said storage means adapted for transmitting the said plant growth information stored in the said storage means to an external device; and a control means for controlling the said indicating means and the said wireless communication means adapted for allowing the apparatus for monitoring plant to be operated with a working mode under a working mode signal received by the said control means.

Typically, the apparatus further comprises a power means being mounted to the said indicating means, the said wireless communication means and the said control means, the said power means is adapted for storing electricity and supplying power to the said indicating means, the said wireless communication mean and the said control means.

Typically, the said power means is adapted to supply power wirelessly.

Typically, the said sensor means comprises at least one or a combination of the following sensors: an optical sensor, a humidity sensor, a temperature sensor, a water level sensor or GPS sensor.

Typically, the said indicating means comprises an electronic scale member and a display control chip adapted for converting the said plant growth information to scale information which is displayed on the said electronic scale member.

Typically, a button means being arranged below the said electronic scale member and mounted to the said control means is adapted to input the said working mode signal to the said control means.

Typically, the said external device is a computer or a mobile phone.

The present invention further provides a system for monitoring plant, which comprises the said apparatus for monitoring plant adapted to be communicated with an external device through wireless communication.

Typically, the said system further comprises at least two the said apparatus, the said storage means of at least two the said apparatus comprise plant identification information adapted for identifying the plants and the said wireless communication means is adapted to transmitting the said plant identification information and the said plant growth information to the said external device.

The present invention further provides a method for monitoring plant comprising the system for monitoring plant, which comprises receiving the said working mode signal; and controlling the said indicating means and the said wireless communication means to be worked in a work mode according to the said working mode signal.

Typically, the said working mode is adapted to be an indicating mode for indicating the said indicating means to work, a transmission mode for indicating information of the said wireless communication means to work or a full working mode for indicating information of both the said wireless communication means and the indicating means to work together.

Typically, the said external device is adapted to take an action corresponding to the said plant growth information after completion of the works of the said wireless communication means and the indicating means according to the said working mode signal.

Typically, the said action of said external device following the said plant growth information is to give a warning signal when the said plant growth information is not in compliance with the default range of plant growth information.

Typically, the said warning signal is a text warning signal, sound warning signal or an image warning signal.

DETAILED DESCRIPTION OF THE PREFERRED EMBODIMENTS

The present invention is further described in details hereinafter with reference to the drawings and embodiments.

Figure 1:
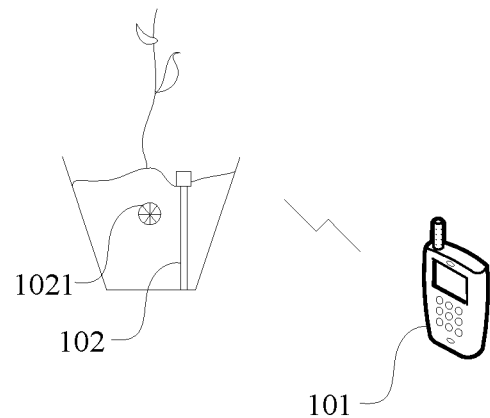
FIG. 1 is a perspective view of a first embodiment of the present invention.

According to the first embodiment and referring to FIG. 1, a system for monitoring plant according to the embodiment mainly comprises a mobile phone 101 as an external device and an apparatus for monitoring plant 102. The mobile phone 101 is mounted to the apparatus for monitoring plant 102 wirelessly. The apparatus for monitoring plant 102 can sense, collect and display the plant growth information and transmit it to the mobile phone 101 for statistical analysis. Plant monitoring related application program can be installed in the mobile phone 101 in order to receive and store the plant growth information, and thus perform the plant monitoring related statistical analysis. The wireless communication can be worked through wireless fidelity (WIFI), radio frequency identification (RFID), and 3G, etc.

Figure 2:
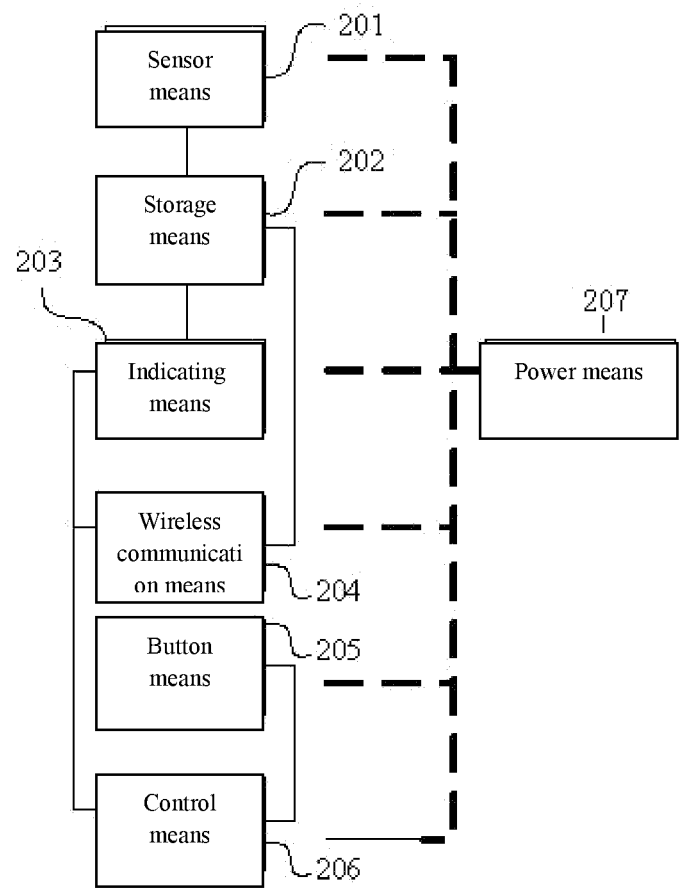
FIG. 2 is a schematic diagram of a apparatus for monitoring plant 102 of the first embodiment 1 of the present invention.

The apparatus for monitoring plant 102 mainly comprises structures as shown in FIG. 2. A sensor means 201 adapted for receiving plant growth information of plant being received inside a container, wherein particularly in the embodiment, the sensor means 201 is a water level sensor capable of sensing the water level of the container and receiving the water level information of the plant growth information; and of course, the sensor means 201 shall be put into soil, self-irrigated type flowerpot or other water planting environments.

A storage means 202 being mounted to the sensor means 201 is adapted for collecting and storing the plant growth information received by the sensor means 201. Typically, a certain waterproof technology can be applied to ensure the normal operation of the storage means 202 and subsequent means if necessary, such as applying a waterproof membrane or using a waterproof shell for protection.

An indicating means 203 being mounted to the storage means 202 is adapted for sending instruction to the plant growth information stored in the storage means 202. Typically, the instruction means 203 can comprise an electronic scale member 1021 and a display control chip. Specifically, the display control chip is adapted for converting the water level information to scale information which is displayed on the electronic scale member 1021. For example, there are a total of 10 water level scales of the container, when the water level information displays the scale 7, there are consecutive 7 indication scales displaying at the electronic scale member with a total of 10 indication scales and the other three instruction indication scales are not displayed which indicates the water level information is in the scale 7.

A wireless communication means 204 being mounted to the storage means 202 is adapted for transmitting the plant growth information stored in the storage means 202 to the mobile phone 101. Typically, the wireless communication means 204 can be a WIFI means or a RFID means, etc.

A button means 205 being arranged below the electronic scale member 1021 is mounted to a control means 206. The button means 205 is adapted to input the working mode signal to the control means 206. For example, when the electronic scale member 1021 is pressed for a first time, the button means will generate a first working mode signal which refers to working under indicating mode, the indicating means 203 is then indicated to work only. When the electronic scale member 1021 is pressed for a second time, the button means will generate a second working mode signal which refers to working under transmission mode, the wireless communication means 204 is then indicated to work only. When the electronic scale member 1021 is pressed for a third time, the button means will generate a third working mode signal which refers to full working mode. Both indicating means 203 and wireless communication means 204 will work together. Alternatively, a signal period can also be provided to complete steps of sensing, storage, indicating and wireless communication in sequence. The signal period can be set by users every 5 minutes or every 20 minutes or other intervals.

A control means 206 is adapted for controlling the indicating means 203 and the wireless communication means 204 to operate in a working mode according to the working mode signal received by the control means 206. Specifically, the control means is adapted for allowing the apparatus for monitoring plant to be operated with a working mode under a working mode signal received by the control means 206. Typically, the control means 206 can be a control chip, which can control the corresponding means to operate according to the working mode signal; and of course, the control means 206 is further required to control the sensor means 201 and the other means or parts of the apparatus to operate.

Figure 3:
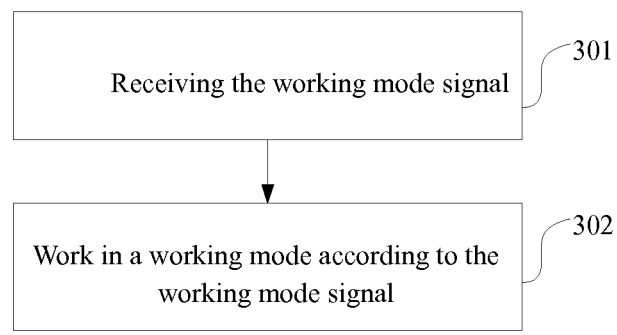
FIG. 3 is a flow chart of a method of monitoring plant of the first embodiment 1 of the present invention.

Accordingly, a method for monitoring plant according to the embodiment mainly comprises the process as shown in FIG. 3 upon the system for monitoring the plant:

Step 301, the control means 206 receives the working mode signal from the button means 205; Step 302, the control means 206 controls the indicating means 203 and the wireless communication means 204 to be operated in the working mode according to the working mode signal. Particularly, the working mode is adapted to be a working mode for indicating information of the indicating means 203 to work, a working mode for indicating information of the wireless communication means 204 for signal transmission or a working mode for sending instruction to both the wireless communication means 204 and the indicating means 203 to work together.

Figure 4:
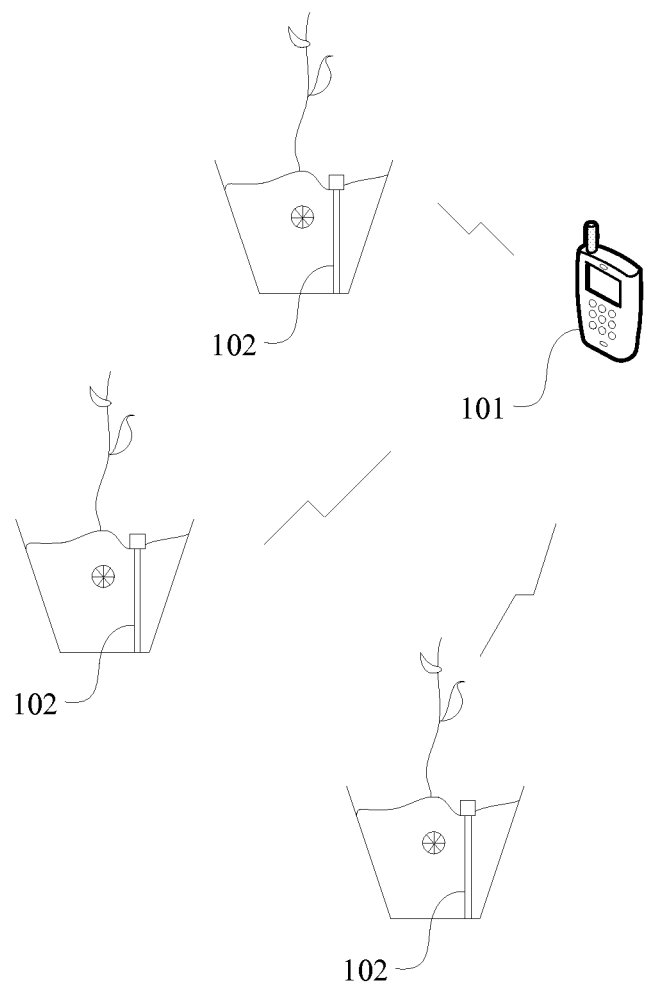
FIG. 4 is a schematic diagram of a system for monitoring plant of a second embodiment of the present invention.

According to a second embodiment, the main differences between the second embodiment and the first embodiment are as follows:

Referring to FIG. 4, the system for monitoring plant according to the embodiment mainly comprises at least two apparatus for monitoring plants 102, in this way, to distinguish the plant monitored by the apparatus for monitoring plant 102, the storage means 202 of each apparatus for monitoring plant 102 comprise plant identification information, and the wireless communication module 204 is adapted to transmitting both the plant growth information and the plant identification information to the mobile phone 101 so as to distinguish which plants being monitored.

According to a third embodiment, the main differences between the third embodiment and the first embodiment are as follows:

In order to monitor the other plant growth information, the sensor means 201 comprises at least one or a combination of the following sensors: an optical sensor, a humidity sensor and a temperature sensor so as to collect at least one or more of water capacity of the flowerpot, illumination information, humidity information and temperature information.

Alternatively, the sensor means 201 can further comprises a global positioning system (GPS) sensor, so that the wireless communication module 204 can also transmit geographical location information of the plant as well as other plant growth information to prevent rare plants from being stolen.

According to a fourth embodiment, the main differences between the fourth embodiment and first embodiment are as follows:

The indicating means 203 can further comprise a light emitting diode (LED) display panel and a display control chip, wherein the display control chip is adapted for converting the water level information into digital information to display on the LED display panel, for example, there are a total of 10 water level scales of the container, when the water level information displays the scale 5, the LED display panel will display number 5, indicating the said water level information is in the scale 5.

According to a fifth embodiment, the main difference between the fifth embodiment and the first embodiment is as follows:

The control means 206 can also receive the working mode signal from the mobile phone 101 or a remote control unit and other devices with wireless function.

According to a sixth embodiment, the main differences between the sixth embodiment and the first embodiment are as follows:

The external device can also be a computer or other intelligent terminals, of course, the information sent from the wireless communication means 204 can be converted by a repeater to the computer or the other intelligent terminals or the mobile phone 101.

According to a seventh embodiment, the main differences between the seventh embodiment and the first embodiment are as follows:

The apparatus for monitoring plant 102 further comprises a power means 207 adapted for storing electricity is mounted to other part(s) or means of the apparatus which requires to be powered through the power means 207. Specifically, the power means is adapted for storing electricity and supplying power to the other means or parts of the apparatus 102 according to the form of switching signal and power mode. For example, the power means 207 can be set as different mode of supplying power, such as power saving mode. As such, the apparatus for monitoring plant 102 will be work under power saving operation mode. Alternatively, the power means 207 can be set to supply power to the wireless communication means 204 wirelessly at a default period in order to allow the wireless communication means 204 to work in a short period of time. Further, the power means 207 can be an external power supply or internal power supply or other power source for supplying power to the apparatus. There is no restriction on how to supply power to the apparatus. For example, it may be one of or a combination of direct current charging, alternative current charging or wireless charging for powering the apparatus. Alternatively, there is no restriction on how to charge the power means 207 itself. It may be one of or a combination of direct current charging, alternative current charging or wireless charging for powering the power means 207.

According to an eighth embodiment, the main differences between the eighth embodiment and the first embodiment are as follows:

The mobile phone 101 is accordingly installed with the apparatus for monitoring plant related application program. The program is able to receiving and storing the plant growth information. It further performs statistical analysis of the information. Alternatively, it can compare the information with the preset numerical values of the monitoring parameters and send message to the user for the comparative result. Alternatively, corresponding actions will be taken according to the comparative results to remind the users. For example, the related application program of the mobile phone is to give a warning signal when the GPS information received by the mobile phone is not in compliance with the pre-stored GPS information, or the water level information received by the mobile phone is lower than the pre-stored water level value. The warning signal can be to start an alarm on the mobile phone, or hint with characters on the interface of the mobile phone, or send automatic emails to a preset mailbox. The specific reminding modes are not limited and can also be selected by the users themselves.

The present invention has been described in detail, with reference to the preferred embodiment, in order to enable the reader to practice the invention without undue experimentation. However, a person having ordinary skill in the art will readily recognize that many of the previous disclosures may be varied or modified somewhat without departing from the spirit and scope of the invention. Accordingly, the intellectual property rights to this invention are defined only by the following claims.

I claim:

1. An apparatus for monitoring plant comprising:
a sensor means adapted for receiving plant growth information of a plant being received inside a container;
a storage means being mounted to the said sensor means adapted for collecting and storing the said plant growth information received by the said sensor means;
an indicating means being mounted to the said storage means adapted for indicating information of the said plant growth information stored in the said storage means;
a wireless communication means being mounted to the said storage means adapted for transmitting the said plant growth information stored in the said storage means to an external device; and
a control means for controlling the said indicating means and the said wireless communication means adapted for allowing the plant monitoring apparatus to be operated with a working mode under a working mode signal received by the said control means.

2. The apparatus for monitoring plant according to claim 1, wherein the apparatus further comprises a power means being mounted to the said indicating means, the said wireless communication means and the said control means, the said power means is adapted for storing electricity and supplying power to the said indicating means, the said wireless communication mean and the said control means.

3. The apparatus for monitoring plant according to claim 2, wherein the said power means is adapted to supply power wirelessly.

4. The apparatus for monitoring plant according to claim 1, wherein the said sensor means comprises at least one or a combination of the following sensors: an optical sensor, a humidity sensor, a temperature sensor, a water level sensor or GPS sensor.

5. The apparatus for monitoring plant according to claim 1, wherein the said indicating means comprises an electronic scale member and a display control chip adapted for converting the said plant growth information to scale information which is displayed on the said electronic scale member.

6. The apparatus for monitoring plant according to claim 5, wherein a button means being arranged below the said electronic scale member and mounted to the said control means is adapted to input the said working mode signal to the said control means.

7. The apparatus for monitoring plant according to claim 1, wherein the said external device is a computer or a mobile phone.

8. A system for monitoring plant, which comprises the apparatus of claim 1 adapted to be communicated with an external device through wireless communication.

9. The system for monitoring plant according to claim 8, wherein the said system further comprises at least two plant monitoring apparatus, the said storage means of at least two plant monitoring apparatus comprise plant identification information adapted for identifying the plants and the said wireless communication means is adapted to transmitting the said plant identification information and the said plant growth information to the said external device.

10. A method for monitoring plant, which comprises the system for monitoring plant according to claim 8, which comprises:
   receiving the said working mode signal; and
   controlling the said indicating means and the said wireless communication means to be worked in a work mode according to the said working mode signal.

11. The method for monitoring plant according to claim 10, wherein the said working mode is adapted to be an indicating mode for indicating the said indicating means to work, a transmission mode for indicating information of the said wireless communication means to work or a full working mode for indicating information of both the said wireless communication means and the indicating means to work together.

12. The method for monitoring plant according to claim 10, wherein the said external device is adapted to take an action corresponding to the said plant growth information after completion of the works of the said wireless communication means and the indicating means according to the said working mode signal.

13. The method for monitoring plant according to claim 12, wherein the said action of said external device following the said plant growth information is to give a warning signal when the said plant growth information is not in compliance with the default range of plant growth information.

14. The method for monitoring plant according to claim 13, wherein the said warning signal is a text warning signal, sound warning signal or an image warning signal.

* * * * *